Figure 1:
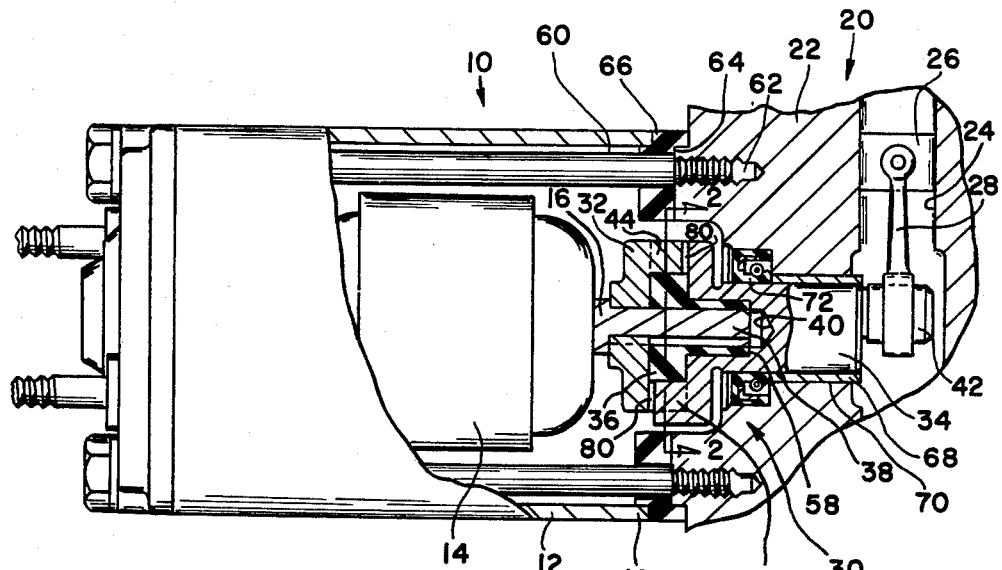

United States Patent [19]

Wilson

[11] Patent Number: 4,540,382
[45] Date of Patent: Sep. 10, 1985

[54] NOISE REDUCTION COUPLING DEVICE FOR AN ELECTRIC MOTOR PUMP

[75] Inventor: Robert K. Wilson, Granger, Ind.
[73] Assignee: Allied Corporation, Morristown, N.J.
[21] Appl. No.: 546,259
[22] Filed: Oct. 28, 1983
[51] Int. Cl.³ .......................... F04B 17/00; F16D 3/68
[52] U.S. Cl. ..................................... 464/73; 417/415; 464/180
[58] Field of Search ...................... 464/73, 87, 92, 93, 464/149, 180, 182; 417/415

[56] References Cited

U.S. PATENT DOCUMENTS

| | | | |
|---|---|---|---|
| 2,706,897 | 4/1955 | Holoye | 464/73 |
| 3,084,852 | 4/1963 | Seavey | 464/87 X |
| 3,118,261 | 1/1964 | Glaude | 464/73 X |
| 3,251,199 | 5/1966 | Brady | 464/73 |
| 3,363,435 | 1/1968 | Crow | 464/73 |
| 3,396,556 | 8/1968 | Giegerich | 464/73 |
| 3,612,728 | 10/1971 | Fulmer | 464/178 X |
| 4,114,472 | 9/1978 | Hornig et al. | 464/93 X |

Primary Examiner—Stuart S. Levy
Assistant Examiner—Daniel P. Stodola
Attorney, Agent, or Firm—Larry J. Palguta; Ken C. Decker

[57] ABSTRACT

A coupling device (30) for connecting the armature (16) of an electric motor (10) to a piston (26) of a pump assembly (20) comprises an input member (32) which rotates and imparts the rotation to an output member (34), with a resilient member (36) disposed between the input member (32) and output member (36) to prevent the transmission of noise-generating vibrations between the electric motor (10) and pump assembly (20). The input and output members (32, 34) have respective axially extending projections (44, 46) circumferentially spaced-apart from each other and fingers (52) of the resilient member (36) extend radially into spacings between the projections (44, 46) in order to transmit rotation of the input member (32) to the output member (34) without permitting transmission of noisegenerating vibrations therebetween.

4 Claims, 2 Drawing Figures

U.S. Patent  Sep. 10, 1985  4,540,382

NOISE REDUCTION COUPLING DEVICE FOR AN ELECTRIC MOTOR PUMP

This invention relates to a coupling device wherein an input member is rotatable to rotate an output member.

In an electric motor pump, such as illustrated in U.S. Pat. No. 3,612,728, issued to Keith Fulmer on Oct. 12, 1971, an output member is coupled to a piston to reciprocate the piston within a housing to form a pump. An input member is formed by an armature of the electric motor so that a coupling device between the input member and the output member transmits rotation therebetween. With the electric motor operating, the armature will experience slight vibration due to bearing misalignment so that the vibration will be transmitted to the output member and the piston of the pump. With the piston reciprocating and also vibrating during operation, the noise level of the operating pump is audible. Consequently, it is desireable to reduce the noise level of the pump during operation.

The present invention proposes a coupling device for an input member and an output member wherein the input member is rotatable about an axis to impart rotation to the output member, one of the members defining an opening for receiving a guide rod formed by the other member, both of the members including axially extending projections forming a plurality of edges facing each other and spaced therefrom in the direction of rotation, both of the members cooperating to define a cavity therebetween which is open to the spacings between the facing edges, and a resilient member disposed within the cavity, the resilient member extending into the spacings to maintain the edges spaced from each other and to transmit rotation of the input member to the output member so that vibration between the input member and the output member is absorbed by the resilient member, and the resilient member including a cylindrical portion extending into the one member opening to engage the guide rod and the one member to resiliently isolate the guide rod from the other member.

It is an advantage of the present invention that the resilient member is provided to transmit torque from the input member to the output member and also provided to isolate the input member from the output member.

Figure 2:
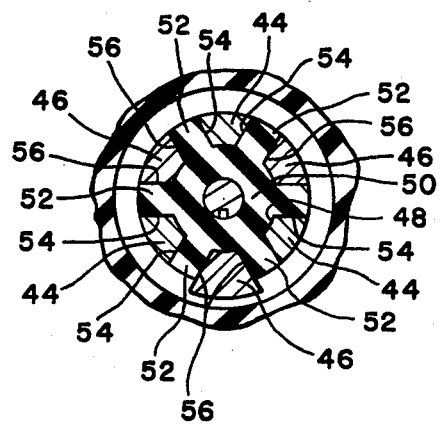

One way of carrying out the invention is described in detail below with reference to the drawings which illustrate a specific embodiment, in which:

FIG. 1 is a partial cutaway view of an electric motor and pump assembly with the coupling device of the present invention shown in cross section; and FIG. 2 is a view taken along view line 2—2 of FIG. 1.

An electric motor 10 includes a casing 12 enclosing a winding assembly 14 and an armature 16 extends through the winding assembly 14 for rotation in response to current flow through the winding assembly. The casing 12 is open at end 18. A pump assembly 20 includes a housing 22 with a bore 24 movably receiving a piston 26. A crank 28 is coupled to the piston 26.

In order to connect the armature 16 with the crank 28, a coupling device 30 is provided between the armature 16 and the crank. The coupling device comprises an input member 32, an output member 34, and a resilient member 36. The input member 32 defines a guide rod 38 extending integrally from the armature 16 into an opening 40 on the output member 34. The output member 34 comprises an eccentric drive shaft with a radially offset post 42 connected to the crank 28. The input member 32 and the output member 34 include a plurality of axially extending projections 44 and 46, respectively. One input member projection 44 and one output member projection 46 are shown in FIG. 1. In FIG. 2 there are three input member projections 44 and three output member projections 46. The input member 32 and the output member 34 cooperate to define a cavity 48 therebetween in the absence of the resilient member 36. The resilient member 36 includes a center portion 50 disposed within and filling the cavity 48 (as shown in FIG. 2) and a plurality of fingers 52 extending radially into spacings between adjacent projections 44 and 46. Each of the fingers 52 is engageable with facing edges 54 and 56 of projections 44 and 46, respectively, to separate the input member projections from the output member projections.

In FIG. 2, the bottom most projection 46 is a counterbalance offsetting the post 42 to accommodate smooth rotation of output member 34.

The resilient member center portion 50 includes an integrally formed cylindrical portion 58 extending into the opening 40 to the end of guide rod 38 in order to separate the guide rod 38 from the output member 34. The electric motor casing is provided with through bolts 60, two being shown in FIG. 1, to threadably engage corresponding apertures 62 in the pump housing 22. The through bolts 60 are stepped with a shoulder 64 to control the disposition of housing 22 adjacent casing 12 so that a resilient disc 66 can be carried tightly between the casing 12 and the housing 22.

A bearing 68 is disposed within a bore 70 leading to bore 24 to rotatably support the output member 34 within the housing 22. A seal 72 extends between the housing and the output member to seal the electric motor windings from the pump bore 24. The projection 46 shown in FIG. 1 for the output member 34 extends radially outwardly of a circular boundary defined by the remainder of the projections 44 and 46 and the fingers 52 in order to form the counter balance opposite from the offset port 42.

In the single embodiment disclosed for the invention, the axial dimension of the resilient member 36 center portion and fingers is greater than the axial dimension of the projections so that a gap 80 is provided between the axial ends of the projections for each member and the opposite member. As a result, the input member is completely isolated via the resilient member 36 from the output member. The electric motor casing is completely isolated via resilient member 66 from the pump housing. Consequently, vibration generated by the electric motor either in the casing or the armature will be retained in the casing and isolated from the pump. Likewise, vibrations produced by the reciprocation of the pump piston are retained in the pump housing, thereby eliminating any noise that occurred at the interface of the prior electric motor casing-pump housing constructions.

I claim:

1. In a noise-reduction coupling device for an electric pump motor, an input member and an output member, the input member rotatable about an axis to impart rotation to the output member, one of the members defining an opening receiving a guide rod formed by the other member, both of the members including axially extending projections forming a plurality of edges facing each other and spaced-apart from each other in the direction of rotation, both of the members cooperating to define a cavity therebetween which is open to the spacings between the facing edges, and a resilient member disposed within the cavity and extending into the spacings to maintain the edges spaced apart from each other and to transmit rotation of the input member to the output member so that noise generating vibrations between the input member and output member are absorbed by the resilient member, the resilient member extensions into the spacings each having an axial length greater than an axial length of any axially extending projection to prevent any projection from engaging the opposite input or output member, the resilient member including a cylindrical portion extending into the opening of the one member to a position adjacent an end of the guide rod and engaging the guide rod and surface of the opening to resiliently isolate the guide rod from the one member and effectively prevent noise-generating vibrations from being transmitted between the guide rod and one member, the one member comprising an eccentric drive shaft with an offset post and one of the axially extending projections of the one member being larger than the remainer of the axially extending projections of the one member in order to define a counterbalance for the offset post.

2. The noise-reduction coupling device in accordance with claim 1, wherein the input member is rotatably supported by a housing and the output member rotatably supported by a casing coupled to the housing, and another resilient member is disposed between the housing and casing to further isolate and prevent the transmission of noise-generating vibrations between the input member and output member.

3. The noise-reduction coupling device in accordance with claim 1, wherein the opening of the one member leads to an end wall and the resilient member abuts the one member and other member to prevent the guide rod from engaging the end wall.

4. The noise-reduction coupling device in accordance with claim 1, wherein the input member, output member, and resilient member cooperate to form a substantially circular outer boundary for the coupling device and the one axially extending projection extends radially outwardly of the circular outer boundary.

* * * * *